US009183556B2

(12) United States Patent
Yoshida

(10) Patent No.: US 9,183,556 B2
(45) Date of Patent: Nov. 10, 2015

(54) DISPLAY CONTROL APPARATUS AND METHOD

(75) Inventor: Takashi Yoshida, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1010 days.

(21) Appl. No.: 12/613,411

(22) Filed: Nov. 5, 2009

(65) Prior Publication Data

US 2010/0118202 A1 May 13, 2010

(30) Foreign Application Priority Data

Nov. 7, 2008 (JP) ................................ 2008-287110

(51) Int. Cl.

*G06F 3/0481* (2013.01)
*G06F 3/14* (2006.01)
*G06Q 30/00* (2012.01)

(52) U.S. Cl.

CPC ..................................... *G06Q 30/00* (2013.01)

(58) Field of Classification Search

CPC ............... G06F 3/14; G06F 3/00; G06F 3/01; G06F 3/33; G06F 3/048; G06F 3/0481; G06F 3/016; G06F 3/03545; G06F 9/44543; G06F 17/30056; H04N 5/44543; H04N 1/00198; H04N 21/234336; H04N 7/0122; H04N 5/145; B60K 37/04; G11B 27/34; G11B 27/034

USPC ................................................ 715/730, 732

See application file for complete search history.

(56) References Cited

U.S. PATENT DOCUMENTS

| | | | | |
|---|---|---|---|---|
| 4,516,156 | A * | 5/1985 | Fabris et al. | 348/14.1 |
| 5,686,957 | A * | 11/1997 | Baker | 348/36 |
| 5,767,897 | A * | 6/1998 | Howell | 348/14.07 |
| 6,346,933 | B1 * | 2/2002 | Lin | 345/157 |
| 6,512,507 | B1 * | 1/2003 | Furihata et al. | 345/157 |
| 7,770,115 | B2 * | 8/2010 | Gallmeier et al. | 715/716 |
| 7,987,423 | B2 * | 7/2011 | Wu et al. | 715/704 |
| 2002/0186351 | A1 * | 12/2002 | Gnanamgari et al. | 353/42 |
| 2004/0141162 | A1 * | 7/2004 | Olbrich | 353/119 |

(Continued)

FOREIGN PATENT DOCUMENTS

| | | | |
|---|---|---|---|
| JP | 2000-339130 | A | 12/2000 |
| JP | 2006-197238 | A | 7/2006 |
| JP | 3948264 | B2 | 7/2007 |

OTHER PUBLICATIONS

Leung et al., A Review and Taxonomy of Distortion-Oriented Presentation Techniques, ACM Transactions on Computer-Human Interaction, vol. 1, No. 2, Jun. 1994, pp. 126-160.*

(Continued)

*Primary Examiner* — Xiomar L Bautista

(74) *Attorney, Agent, or Firm* — Canon USA, Inc. IP Division

(57) ABSTRACT

A display control apparatus that can display a video includes an inputting unit configured to input the video, a designation unit configured to designate an area in the video, a detection unit configured to detect that a coordinate in the designated area of the video has been pointed, and a display control unit configured to control a display size of a predetermined area in the video in such a manner that the display size of the predetermined area is larger when the detection unit detects that the coordinate in the designated area has been pointed than when the detection unit does not detect any pointing of the coordinate in the designated area.

9 Claims, 14 Drawing Sheets

(56) References Cited

U.S. PATENT DOCUMENTS

| | | | | |
|---|---|---|---|---|
| 2004/0189720 | A1* | 9/2004 | Wilson et al. | 345/863 |
| 2005/0166151 | A1 | 7/2005 | Isozaki | |
| 2005/0237297 | A1* | 10/2005 | Holloway et al. | 345/157 |
| 2006/0098167 | A1* | 5/2006 | Sato | 353/35 |
| 2006/0230332 | A1* | 10/2006 | Lin | 715/500.1 |
| 2007/0035614 | A1* | 2/2007 | Tamaru et al. | 348/14.08 |
| 2009/0051671 | A1* | 2/2009 | Konstas | 345/174 |
| 2009/0172606 | A1* | 7/2009 | Dunn et al. | 715/863 |
| 2010/0013801 | A1* | 1/2010 | Kondo et al. | 345/179 |
| 2010/0031152 | A1* | 2/2010 | Villaron et al. | 715/731 |

OTHER PUBLICATIONS

Osumi Tsuyoshi, JP2000-339130, Display Controller and Recording Medium for Recording Display Control Program, Dec. 8, 2000, machine translation.*

Kamikura Hiroshi et al., JP2006-197238, Remote Presentation System, Image Distribution Apparatus, Image Distribution Method, and Program, Jul. 27, 2006, machine translation.*

* cited by examiner

SCENE OF CONFERENCE ROOM

OUTPUT IMAGE

SCENE OF CONFERENCE ROOM

OUTPUT IMAGE

SCENE OF CONFERENCE ROOM

OUTPUT IMAGE

SCENE OF CONFERENCE ROOM

OUTPUT IMAGE

SCENE OF CONFERENCE ROOM

OUTPUT IMAGE

DISPLAY CONTROL APPARATUS AND METHOD

BACKGROUND OF THE INVENTION

1. Field of the Invention

The present invention relates to a display control apparatus for causing a display apparatus to display an image captured by an imaging apparatus thereon.

More specifically, the present invention relates to, for example, a display control apparatus that distributes to a display apparatus a video of a conference in which a presentation material created as electronic data is used.

2. Description of the Related Art

In recent years, a personal computer has enabled a presenter of a conference or a lecture to prepare a presentation material as electronic data beforehand. A screen or a large-scale television can be used to display the presentation material.

In general, in such a conference or a lecture, a large-scale projector or a large-scale television is available for all members or participants. Alternatively, a monitor dedicated to each participant can be provided in the vicinity of the participant. A presentation material or images captured by a camera (hereinafter, referred to as a conference video) can be distributed to these monitors.

When a conference video is available as electronic data or digital data, a remote conference can be realized to enable each participant of a conference to attend the conference even when the participant is not present in a conference room. In this case, a remote distribution system needs to be constructed to distribute the conference video captured in the conference room to a remote place where a participant is present.

More specifically, as illustrated in FIG. 14, the above-described conference video generally includes an image of the presenter captured together with a screen or a large-scale television that displays a presentation material. Therefore, each participant can attend the conference through a dedicated monitor such that the participant has the feeling such that the participant is actually listening to the presentation in the conference room.

However, the above-described conventional remote distribution system has the following problems. First, if the conference video is insufficient in resolution or the monitor is relatively small in size, it may be difficult to read a presentation material displayed as a part of the conference video.

Second, as a simple method for solving the above-described problem, it may be useful to electronically distribute only the presentation material. However, in this case, motions or expressions of the presenter cannot be viewed. In other words, an actual atmosphere in the conference room cannot be transmitted to each remote participant.

Third, as a method for solving the above-described first and second problems, it may be useful to distribute the conference video and the presentation material separately and display the presentation material in synchronization with the content of the distributed conference video. However, in this case, each remote participant is required to determine a screen to be looked at. For example, if a presenter uses a laser pointer, each remote participant is required to confirm a pointed position on the conference video. Further, the participant is required to read a corresponding portion from the electronic data.

Fourth, as a method for solving the above-described first to third problems, it may be desired that a presenter or an operator selectively distributes a conference video together with related electronic data. However, in this case, a heavy burden may be placed on the presenter or the operator.

A conventional technique, for example as discussed in Japanese Patent No. 3948264, can solve the above-described problems. According to the technique discussed in Japanese Patent No. 3948264, when there are two or more inputs, a function is available to identify an image presently displayed by an information control display device. Therefore, the technique discussed in Japanese Patent No. 3948264 can determine availability of information.

However, the technique discussed in Japanese Patent No. 3948264 is intended to use only electronic data and therefore cannot be applied to the above-described conference video. In particular, not only a mouse but also a laser pointer may be used in an actual conference. Further, a presenter may manually point on a material with his/her finger. In these cases, the technique discussed in Japanese Patent No. 3948264 cannot be effectively used.

SUMMARY OF THE INVENTION

The present invention is directed to a technique to reduce a burden on a user in an operation for increasing an area in a video.

According to an aspect of the present invention, a display control apparatus that can display a video includes an inputting unit configured to input the video, a designation unit configured to designate an area in the video, a detection unit configured to detect that a coordinate in the designated area of the video has been pointed, and a display control unit configured to control a display size of a predetermined area in the video in such a manner that the display size of the predetermined area is larger when the detection unit detects that the coordinate in the designated area has been pointed than when the detection unit does not detect any pointing of the coordinate in the designated area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
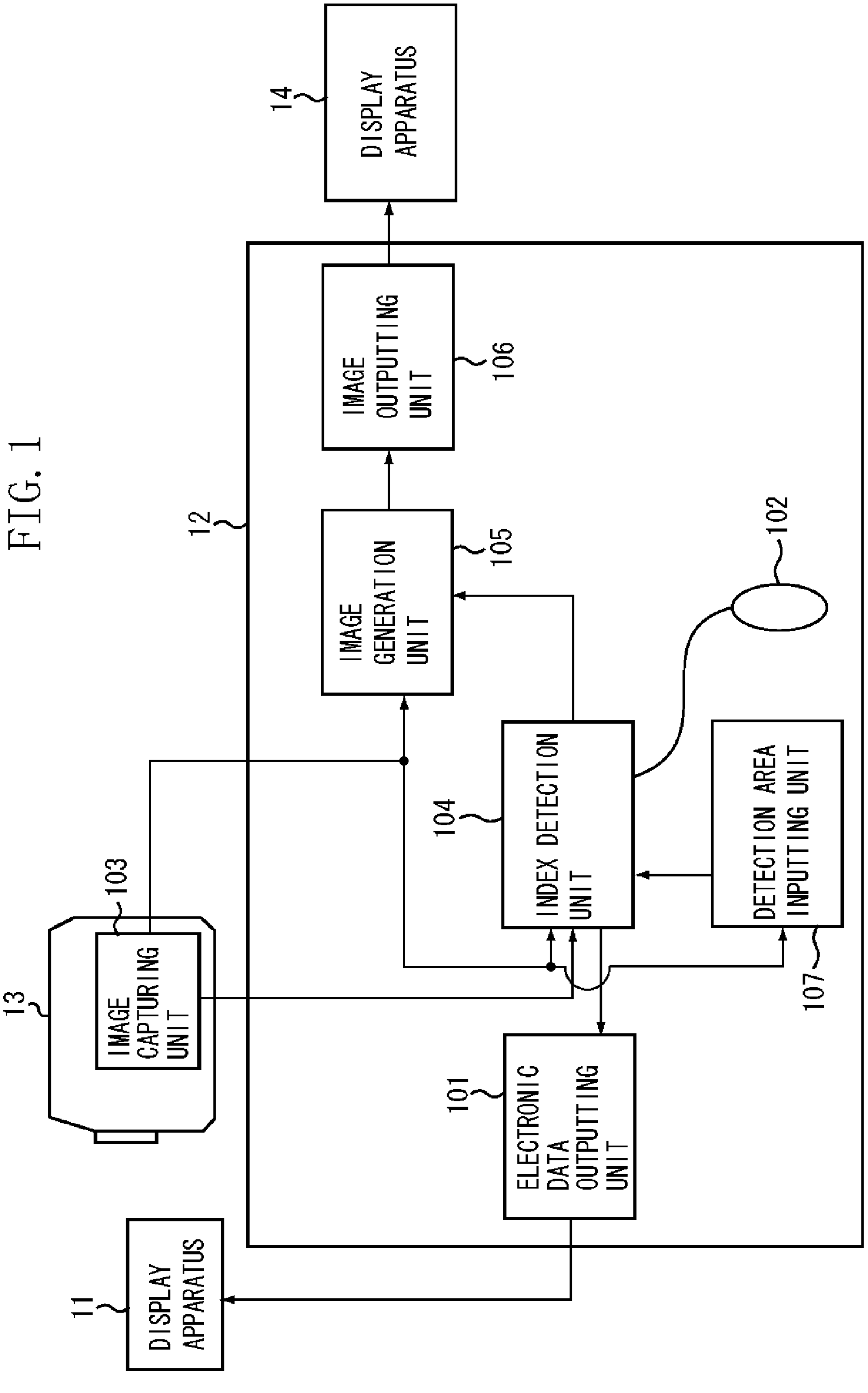
FIG. 1 illustrates an example of an apparatus configuration of an image distribution system according to a first exemplary embodiment of the present invention.

FIG. 1 illustrates an example of a configuration of an image distribution system according to a first exemplary embodiment according to the present invention. A display apparatus 11 illustrated in FIG. 1 can be configured by a forward projection type projector and a screen or a large-scale display apparatus. The display apparatus 11 is connected to an information processing apparatus 12. The information processing apparatus 12 can control a display content to be displayed on the display apparatus 11.

The information processing apparatus 12 includes a central processing unit (CPU), a read only memory (ROM), and a random access memory (RAM). The ROM stores programs relating to various operations to be performed by the information processing apparatus 12. The CPU can execute each program loaded in the RAM from the ROM, so that the information processing apparatus 12 can perform a required operation.

For example, the information processing apparatus 12 is a personal computer. An operator (who may be identical to a presenter) can operate the information processing apparatus 12 to display a material for use in presentation (i.e., electronic data representing a content to be presented) using the display apparatus 11.

In other words, the information processing apparatus 12 is a display control apparatus that causes the display apparatus 11 to display a video. An internal configuration of the information processing apparatus 12 is described below in more detail. As described above, a general personal computer can realize the information processing apparatus 12 according to the present exemplary embodiment. However, any other apparatus which has similar capabilities and functions can be used as the information processing apparatus 12 according to the present exemplary embodiment.

An imaging apparatus 13 can be generally configured as a digital video camera. The imaging apparatus 13 can include a panning mechanism and a tilting mechanism, if these mechanisms are required. In this case, the imaging apparatus 13 can control a panning amount and a tilting amount.

The imaging apparatus 13 can further include a zooming mechanism and can control a zooming amount thereof. The imaging apparatus 13 can capture a moving image of a presenter or the display apparatus 11 as a conference video. The imaging apparatus 13 includes an image capturing unit 103 that can capture images, an interface and a power source device (not illustrated). A detailed configuration of the image capturing unit 103 is described below with reference to FIG. 3.

The information processing apparatus 12 has the following internal configuration. The information processing apparatus 12 includes an electronic data outputting unit 101 that is connected to the display apparatus 11. The electronic data outputting unit 101 can control the display apparatus 11 to display electronic data stored in the information processing apparatus 12.

A pointer inputting apparatus 102 (i.e., an index inputting unit) can be generally configured as a mouse connected to the information processing apparatus 12. Pointer information having been input via the pointer inputting apparatus 102 can be transmitted to the electronic data outputting unit 101. The electronic data outputting unit 101 superimposes a pointer (i.e., an index) on the electronic data and causes the display apparatus 11 to display a composite image. Meanwhile, an index detection unit 104 can receive position information of the pointer.

The index detection unit 104 can receive a conference video from the image capturing unit 103 and can detect a pointer that is present in a pointer detection area. The index detection unit 104 can receive the electronic data output from the electronic data outputting unit 101 and can detect the pointer included in the received electronic data.

A detection area inputting unit 107 can arbitrarily designate the pointer detection area in a below-described starting state. Generally, the pointer detection area is identical to an area (such as an area in a screen) in which the electric data is displayed on the display apparatus 11 in an angle of view.

The index detection unit 104 can set an area designated by the detection area inputting unit 107 as the pointer detection area. Further, a video to be used to detect a pointer which is a part of the conference video (i.e., images) acquired by the image capturing unit 103 is input to the index detection unit 104. Thus, the index detection unit 104 can detect a pointer from the pointer detection video input from the image capturing unit 103. The pointer to be detected is, for example, a pointer instructed by the pointer inputting apparatus 102 or a laser pointer used by a presenter.

The index detection unit 104 converts information relating to a number of detected pointers into electronic data. The index detection unit 104 further converts horizontal and vertical coordinate values of each detected pointer included in the conference video into coordinate values of electronic data. Subsequently, the index detection unit 104 sends the converted data to an image generation unit 105 (which is positioned on the downstream side of the index detection unit 104).

To realize the coordinate conversion, the index detection unit 104 can apply affine transformation to the pointer detection area and perform mapping to obtain coordinates of the electronic data. Further, the index detection unit 104 acquires electronic data from the electronic data outputting unit 101 and horizontal and vertical coordinate values in the electronic data input via the pointer inputting apparatus 102. The index detection unit 104 sends the acquired data to the image generation unit 105.

The image generation unit 105 which is configured to execute image processing can receive the conference video output from the image capturing unit 103 as well as presently displayed electronic data output from the electronic data outputting unit 101. The image generation unit 105 can further receive pointer detection result information about a pointer involved in the conference video and the pointer detection result obtained from the electronic data which are detected by the index detection unit 104.

Figure 3:
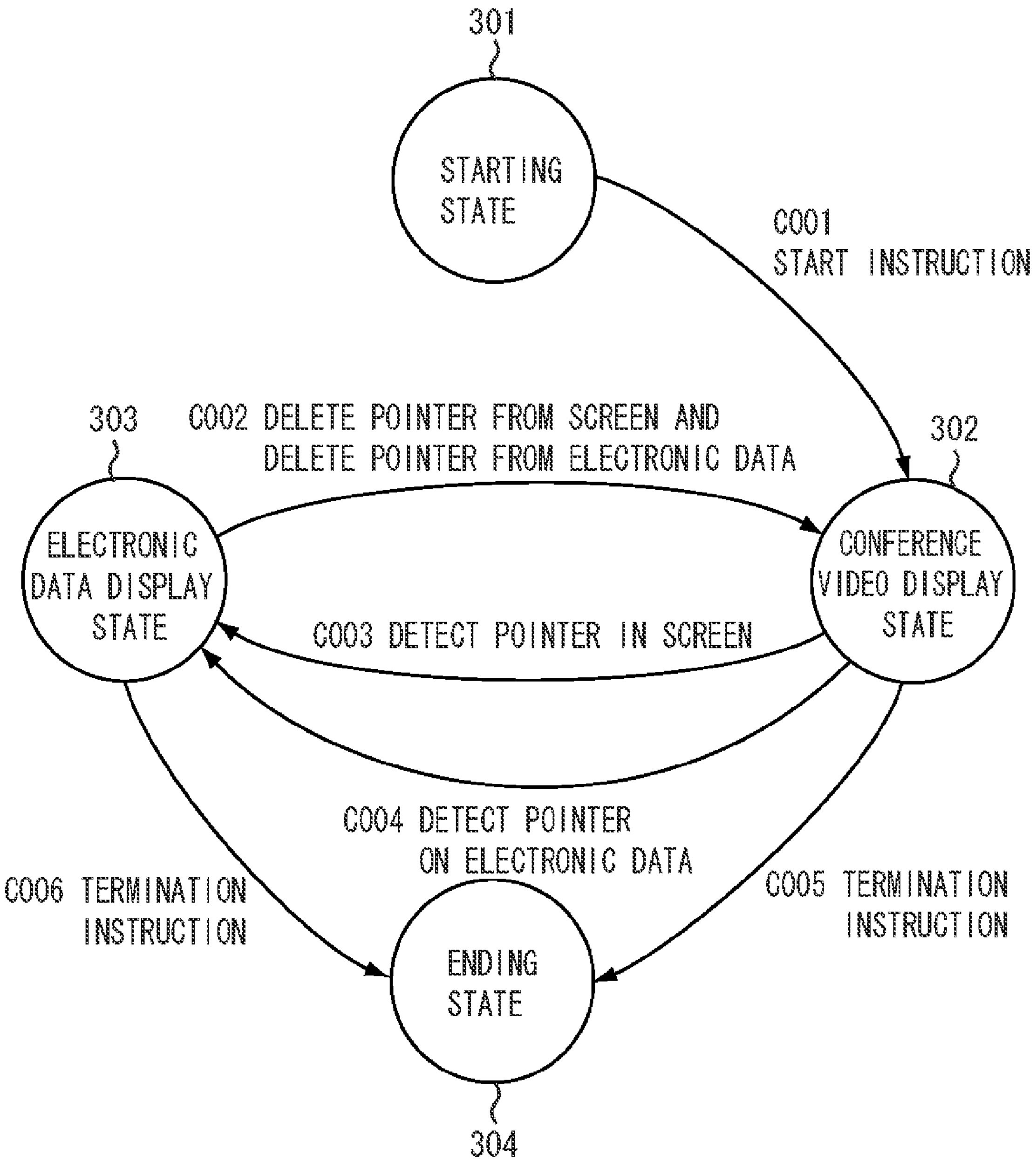
FIG. 3 is state transition diagram illustrating an example of state transitions of the image distribution system according to the first exemplary embodiment.

Then, the image generation unit 105 determines whether to display the conference video or the electronic data based on the pointer detection result information referring to state transitions illustrated in FIG. 3. The image generation unit 105 generates an output image based on the selected image. The state transitions illustrated in FIG. 3 are described below in more detail.

Figure 4A:
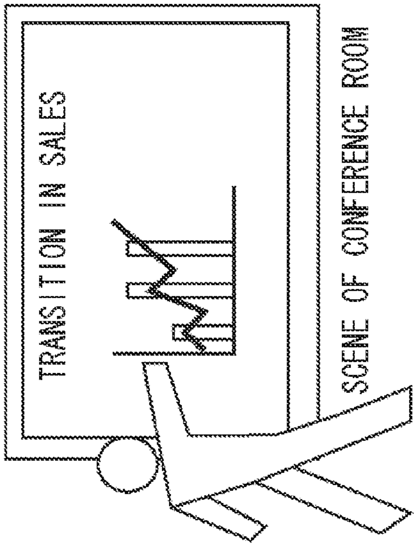
FIGS. 4A to 4D illustrate examples of a scene of an actual conference room and examples of a display screen of a monitor located near a participant when the image distribution system according to the first exemplary embodiment is used.
Figure 4B:
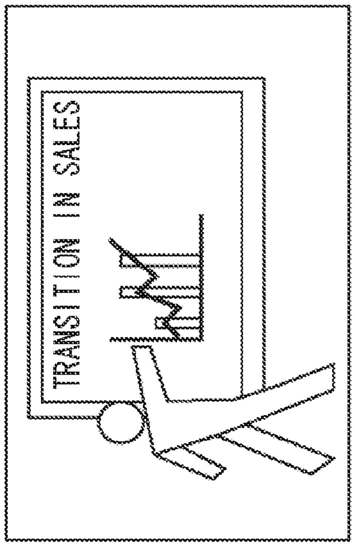
Figure 4C:
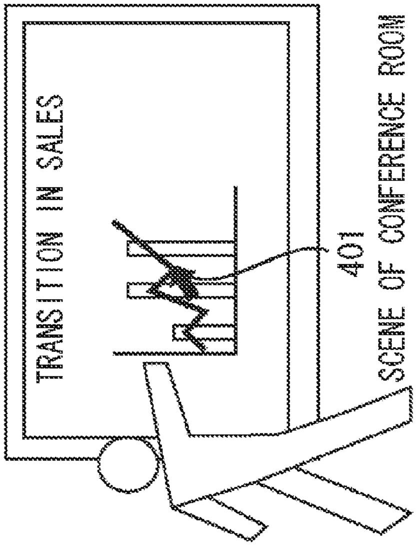
Figure 4D:
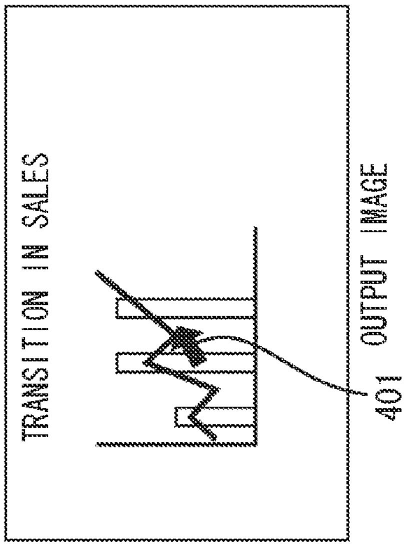

An example of image generation, either the conference video or the electronic data can be simply selected. It is also useful to provide two display areas in an output image and largely display a selected image. Alternatively, the selected image can be displayed on the front side. Further, simultaneously generated images can be compression coded to reduce an amount of data to be processed. Moreover, when the image generation unit 105 outputs the electronic data, the image generation unit 105 can superimpose the above-described pointer detection result information (i.e., a pointer 401) on the electronic data as illustrated in FIG. 4D.

In the present exemplary embodiment, the image generation unit 105 is provided in a transmission side. However, the image generation unit 105 can be provided in a reception side, namely a display apparatus 14 side.

In this case, the image distribution system according to the present invention can be realized by application sharing, in which the electronic data can be shared between the transmission side and the reception side and the same application can be operated synchronously between the transmission side and the reception side.

In the application sharing, the image generation unit 105 can display the electronic data by synchronizing the electronic data shared beforehand without receiving any data from the transmission side. In this case, the image generation unit 105 can generate a composite image including the pointer detection result information superimposed on the electronic data.

An image outputting unit 106 receives the image generated by the image generation unit 105 and can output the received image to one or more monitors (e.g., the display apparatus 14 which is an example of an external apparatus according to the present invention) according to a predetermined protocol.

The image outputting unit 106 can be, for example, a display adapter configured to control a monitor if the display adapter can output images to the monitor that is present in the same conference room. In this case, the image outputting unit 106 can output images via a general output terminal, such as a digital visual interface (DVI) output terminal. Further, when the image distribution system performs remote distribution of images, the image outputting unit 106 can be generally configured as a network adapter, such as Ethernet which can output an image according to a general Transmission Control Protocol/User Datagram Protocol (TCP/UDP) protocol.

An operator of the image distribution system according to the present exemplary embodiment can designate an area of electronic data displayed from a conference video in a starting state (i.e., a state where the imaging apparatus 13 starts recording the conference video after the conference starts). The detection area inputting unit 107, as described above, inputs information relating to the predetermined area designated by the operator into the index detection unit 104.

Figure 2:
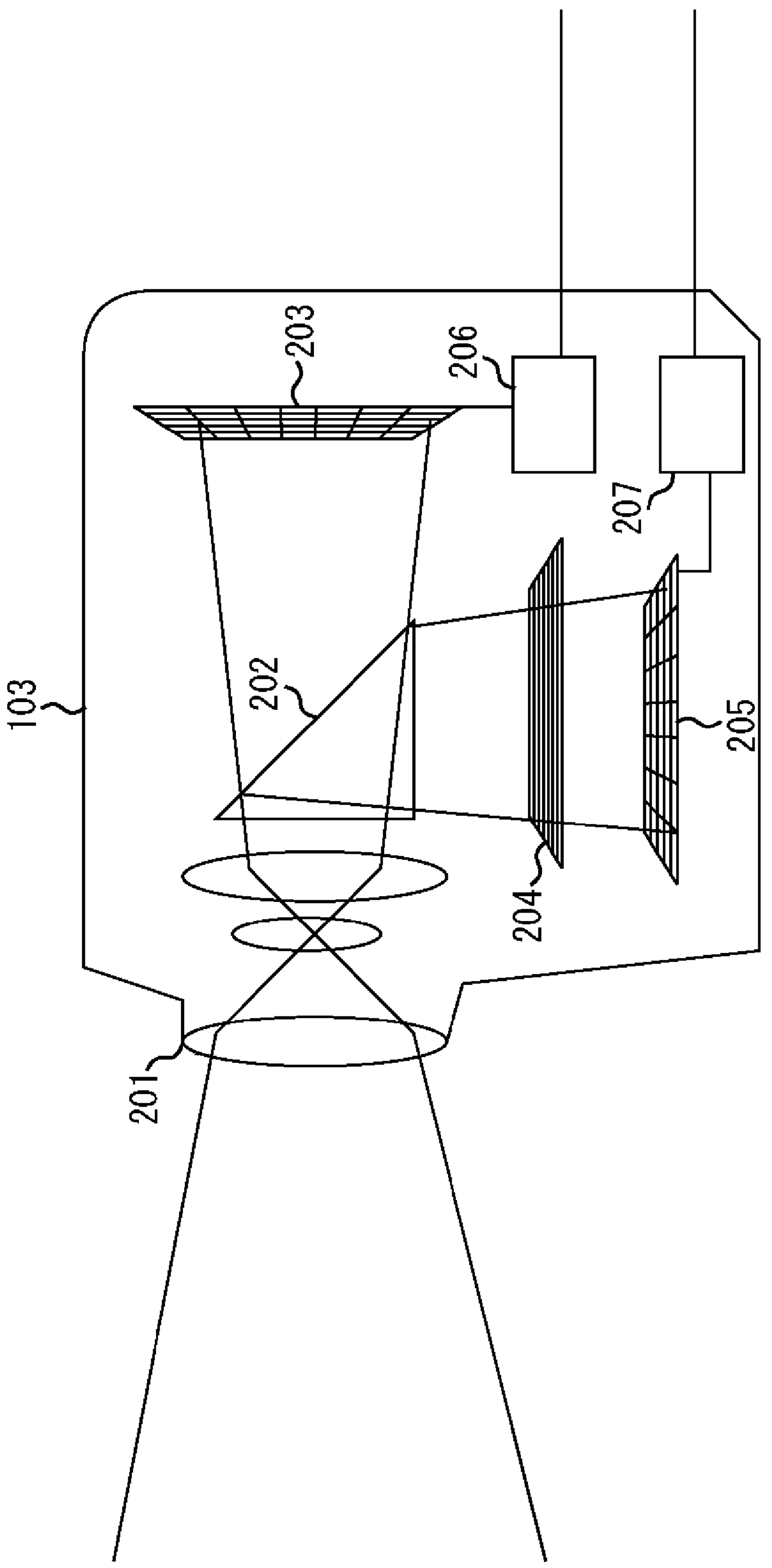
FIG. 2 illustrates an example configuration of an image capturing unit of an imaging apparatus included in the image distribution system according to the first exemplary embodiment.

FIG. 2 illustrates an example of a configuration of the image capturing unit 103. The image capturing unit 103 illustrated in FIG. 2 includes a lens 201 that can determine an angle of view and a focal position of input light. The lens 201 forms an image of the input light on a video image sensor 203 and a pointer detection image sensor 205 which are described below. A half mirror 202 can split the input light at an appropriate ratio to distribute it to the video image sensor 203 and the pointer detection image sensor 205. It is desired to set a distribution ratio of the half mirror 202 so that the pointer detection image sensor 205 can receive a minimum quantity of light required to perform pointer detection.

The video image sensor 203 can be generally configured as photoelectric conversion sensor allay constituted by a plurality of charge coupled devices (CCDs) or complementary metal oxide semiconductors (CMOSs). A video reading circuit 206 which is associated with the video image sensor 203 read an amount of electric charge accumulated in the video image sensor 203.

A polarizing filter 204 has optical characteristics capable of transmitting only light components having a specific frequency and a specific phase of the input light distributed by the half mirror 202. The polarizing filter 204 can effectively detect a laser pointer constituted by specific coherent light.

The pointer detection image sensor 205 can be generally configured as a photoelectric conversion array constituted by a plurality of CCDs or CMOSs. A pointer detection reading circuit 207 which is associated with the pointer detection image sensor 205 reads an amount of electric charge accumulated in the pointer detection image sensor 205. Resolution of the pointer detection image sensor 205 needs not to be identical to the video image sensor 203 and can be determined considering a spatial resolution required in the pointer detection.

The video reading circuit 206 can read the electric charge which has been photoelectrically converted by the video image sensor 203 and perform analog-digital (A/D) conversion on the read electric charge to output a digital signal. The pointer detection reading circuit 207 can read the electric charge which has been photoelectrically converted by the pointer detection image sensor 205 and perform A/D conversion on the read electric charge to output a digital signal.

Example operations that can be performed by the image distribution system according to the present exemplary embodiment are described below with reference to FIGS. 3 to 6. FIG. 3 illustrates an example of the state transitions of the image distribution system according to the present exemplary embodiment.

FIGS. 4A to 4D illustrate examples of a scene of an actual conference room and examples of a display screen of the display apparatus 14 (i.e., a monitor located near a participant) when the image distribution system according to the present exemplary embodiment is used.

Figure 5:
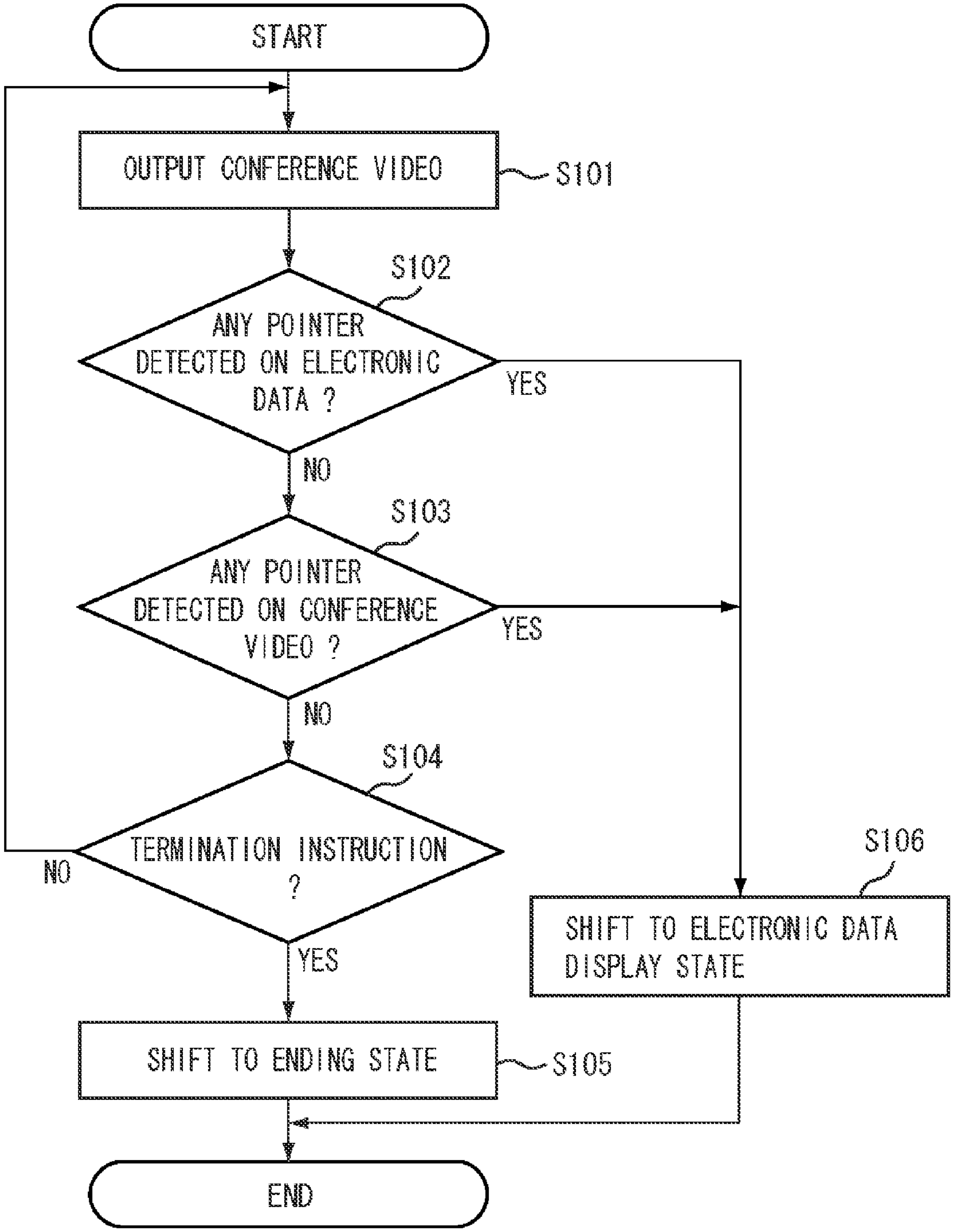
FIG. 5 is a flowchart illustrating an example of processing to be executed in a conference video display state of the image distribution system according to the first exemplary embodiment.
Figure 6:
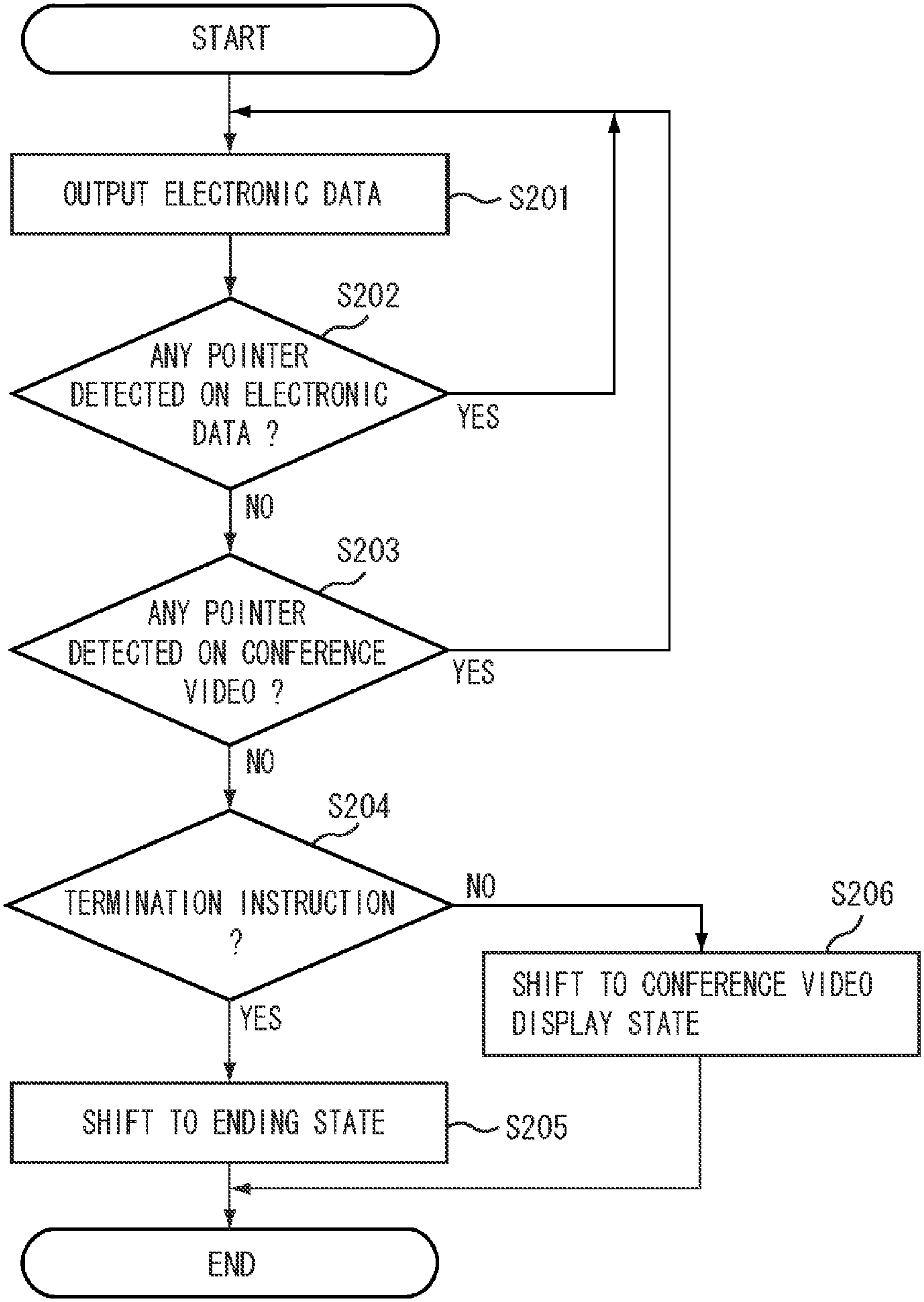
FIG. 6 is a flowchart illustrating an example of processing to be executed in an electronic data display state of the image distribution system according to the first exemplary embodiment.

FIG. 5 is a flowchart illustrating an example of processing to be executed in a conference video display state 302 of the image distribution system, which is one of the state transitions illustrated in FIG. 3. FIG. 6 is a flowchart illustrating an example of processing to be executed in a below-described electronic data display state 303 of the image distribution system, which is one of the state transitions illustrated in FIG. 3.

First, various state transitions of the image distribution system according to the present exemplary embodiment are described below with reference to FIG. 3. In FIG. 3, the image distribution system is in a starting state 301 when the image distribution system performs a startup operation.

In the starting state, the detection area inputting unit 107 instructs an operator to input a detection area. More specifically, the detection area inputting unit 107 displays an appropriate message on its screen to prompt the operator to input the detection area. If the operator completes the input operation, the detection area inputting unit 107 notifies the index detection unit 104 of input area information, and waits for a start instruction to be input by the operator.

In FIG. 3, a transition condition C001 indicates a transition from the starting state to the below-described conference video display state 302. The transition condition C001 can be satisfied, for example, when the operator presses a start button (not illustrated) to input the start instruction.

In the conference video display state 302, the image generation unit 105 generates an image based on a conference video received from the image capturing unit 103. The image generation unit 105 transfers the generated image to the image outputting unit 106. FIG. 4B illustrates an example of the image output from the image outputting unit 106 in the conference video display state 302. FIG. 4A illustrates an example of a scene of an actual conference room corresponding to FIG. 4B.

Further, in FIG. 3, the image distribution system shifts its operational state from the conference video display state 302 to the below-described electronic data display state 303 when at least one of transition conditions C003 and C004 is satisfied. Moreover, the image distribution system shifts its operational state from the conference video display state 302 to a below-described ending state 304 when a transition condition C005 is satisfied.

The transition condition C003 can be satisfied when a pointer is detected in a detection area of a conference video acquired by the image capturing unit 103. Accordingly, when a presenter or a conference participant points somewhere on an image displayed by the display apparatus 11 with a laser pointer, the transition condition C003 can be satisfied. The transition condition C004 can be satisfied when the presenter operates the pointer inputting apparatus 102 of the information processing apparatus 12 to display (superimpose) a pointer on electronic data. For example, the transition condition C005 can be satisfied when the operator presses a termination button (not illustrated) to input a termination instruction.

In the electronic data display state 303, the image generation unit 105 generates an image based on electronic data received from the electronic data outputting unit 101 and sends the generated image to the image outputting unit 106. FIG. 4D illustrates an example of the image output from the image outputting unit 106 in the electronic data display state 303. FIG. 4C illustrates an example of a scene of the actual conference room corresponding to FIG. 4D.

In each of FIGS. 4C and 4D, the pointer 401 (i.e., a mark having a bold arrow shape) is illustrated. In FIG. 3, the image distribution system shifts its operational state from the electronic data display state 303 to the conference video display state 302 when a transition condition C002 is satisfied. The transition condition C002 can be satisfied when no pointer is detected either in the detection area of the conference video acquired by the image capturing unit 103 or on the electronic data.

Further, the image distribution system shifts its operational state from the electronic data display state 303 to the below-described ending state 304 when a transition condition C006 is satisfied. For example, the transition condition C006 can be satisfied when the operator presses the termination button (not illustrated) to input the termination instruction.

As described above, the image distribution system shifts its operational state to the ending state 304 if the operator presses the termination button (not illustrated), for example, in the conference video display state 302 or in the electronic data display state 303.

An example of condition determination processing to be executed in the conference video display state 302, which can be performed by the image distribution system according to the present exemplary embodiment, is described below with reference to FIG. 5. First, in step S101, the image outputting unit 106 outputs a conference video.

Next, in step S102, the index detection unit 104 tries to detect a pointer from electronic data displayed on the display apparatus 11. The processing performed in step S102 corresponds to the state transition condition C004. If the index detection unit 104 can detect a pointer (YES in step S102), the processing immediately proceeds to step S106. On the other hand, if the index detection unit 104 cannot detect any pointer from the electronic data (NO in step S102), the processing proceeds to step S103.

In step S103, the index detection unit 104 tries to detect a pointer from a pointer detection area of the conference video obtained by the image capturing unit 103. The processing performed in step S103 corresponds to the state transition condition C003. If the index detection unit 104 can detect a pointer (YES in step S103), the processing immediately proceeds to step S106. On the other hand, if the index detection unit 104 cannot detect any pointer from the pointer detection area of the conference video (NO in step S103), the processing proceeds to step S104.

In step S104, the CPU (not illustrated) included in the information processing apparatus 12 determines whether the termination instruction is input. The CPU executes the above-described processing (step S104) when the CPU detects an operation of a termination instruction button (not illustrated). If the termination instruction is input (YES in step S104), the processing proceeds to step S105. On the other hand, if the termination instruction is not input (NO in step S104), the processing returns to step S101.

In step S105, the CPU (not illustrated) causes the image distribution system to shift its operational state to the ending state. In step S106, the CPU (not illustrated) causes the image distribution system to shift its operational state to the electronic data display state 303.

Next, an example of condition determination processing to be executed in the electronic data display state 303, which can be performed by the image distribution system according to the present exemplary embodiment, is described below with reference to FIG. 6. First, in step S201, the image outputting unit 106 outputs electronic data.

Next, in step S202, the index detection unit 104 tries to detect a pointer from the electronic data displayed on the display apparatus 11. If the index detection unit 104 can detect a pointer (YES in step S202), the processing returns to step S201. More specifically, as long as the pointer is continuously detected from the electronic data, the image distribution system maintains the electronic data display state 303. On the other hand, if the index detection unit 104 cannot detect any pointer from the electronic data (NO in step S202), the processing proceeds to step S203.

In step S203, the index detection unit 104 tries to detect a pointer from the pointer detection area of the conference video acquired by the image capturing unit 103. If the index detection unit 104 can detect a pointer (YES in step S203), the processing returns to step S201. More specifically, as long as the pointer is continuously detected from the conference video, the image distribution system maintains the electronic data display state 303. On the other hand, if the index detection unit 104 cannot detect any pointer from the pointer detection area of the conference video (NO in step S203), the processing proceeds to step S204.

In step S204, the CPU (not illustrated) included in the information processing apparatus 12 determines whether the termination instruction is input. The CPU executes the above-described processing (step S204) when the CPU detects an operation of the termination instruction button (not illustrated). If the termination instruction is input (YES in step S204), the processing proceeds to step S205. On the other hand, if the termination instruction is not input (NO in step S204), the processing proceeds to step S206.

In step S205, the CPU (not illustrated) causes the image distribution system to shift its operational state to the ending state. In step S206, the CPU (not illustrated) causes the image distribution system to shift its operational state to the conference video display state 302.

The image distribution system according to the first exemplary embodiment of the present invention has the above-described configuration and can perform the above-described operations. The image distribution system according to the present exemplary embodiment can be used when a presenter uses a presentation material prepared as electronic data.

More specifically, the image distribution system according to the present exemplary embodiment can adaptively output a conference video and electronic data to a specific display apparatus according to a pointer (i.e., index) detection result. Thus, the image distribution system according to the present exemplary embodiment can intentionally notify an information receiver (i.e., a participant) of the most notable item without placing a burden on the operator or the participant when the conference video is distributed.

As described above, the image outputting unit 106 according to the present exemplary embodiment can provide two display areas in an output image and can largely display a selected image. Similarly, if there are two monitors available for each participant, the image distribution system according to the present exemplary embodiment can distribute the conference video to one monitor and the electronic data to the other monitor.

In such a case, if the index detection unit 104 detects a pointer in the electronic data, the image outputting unit 106 can largely display the image generated based on the electronic data compared to the conference video. Further, when no pointer is detected, the image outputting unit 106 can largely display an image generated based on the conference video compared to the image obtained from electronic data. Thus, the participant can easily identify an image to be looked at.

Figure 7:
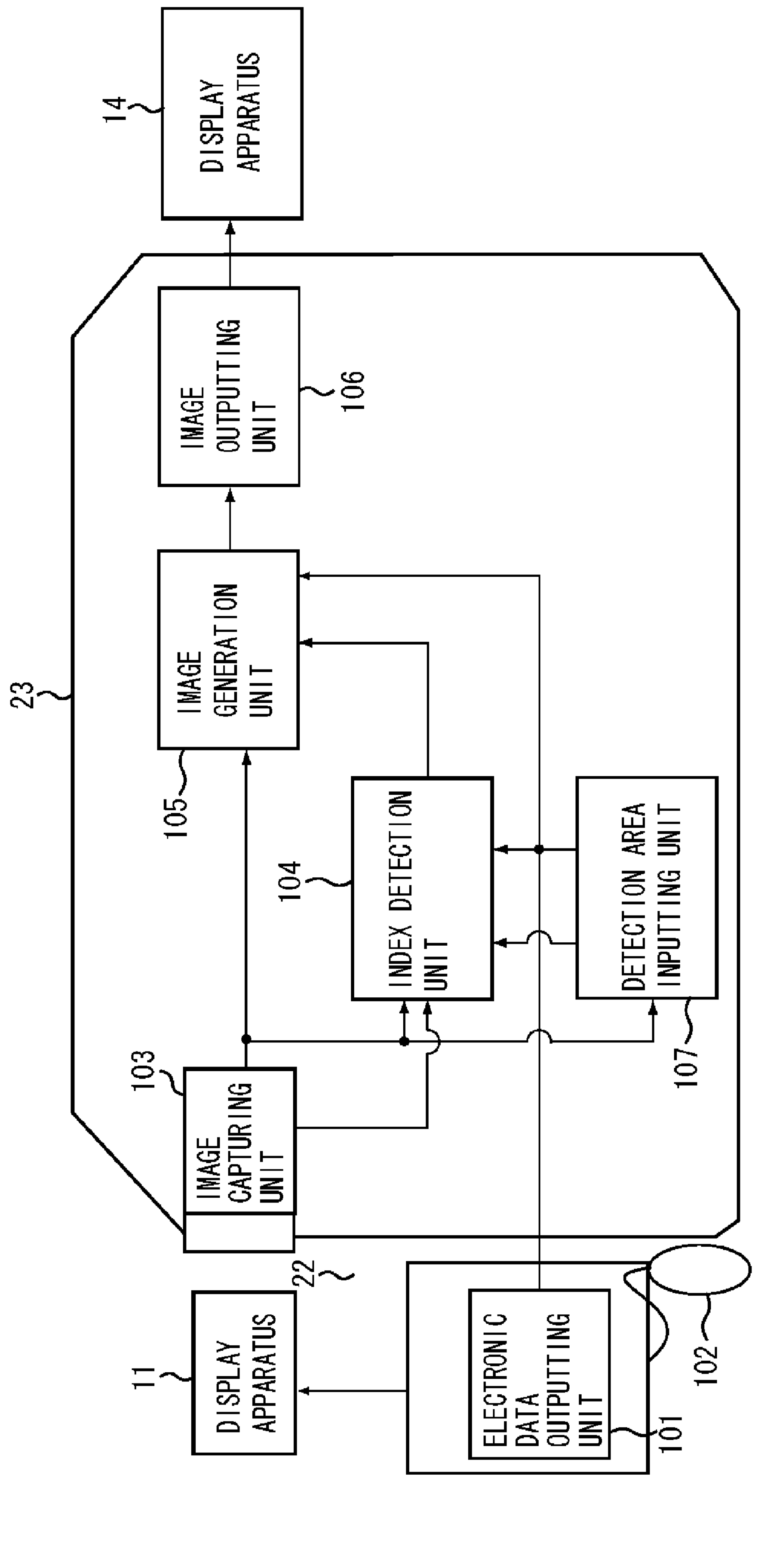
FIG. 7 illustrates an example of an apparatus configuration of an image distribution system according to a second exemplary embodiment of the present invention.

Next, an image distribution system according to a second exemplary embodiment of the present invention is described below. FIG. 7 illustrates an example of an apparatus configuration of the image distribution system according to the second exemplary embodiment. In the present exemplary embodiment, constituent components similar to those described in the first exemplary embodiment are denoted by the same reference numerals and their descriptions are not repeated.

More specifically, a display apparatus 11 illustrated in FIG. 7 is similar to the display apparatus 11 described in the first exemplary embodiment. In the present exemplary embodiment, an information processing apparatus 22 includes an electronic data outputting unit 101 and a pointer inputting apparatus 102. The information processing apparatus 22 can store electronic data output from the electronic data outputting unit 101.

In the present exemplary embodiment, an imaging apparatus 23 includes an image capturing unit 103, an index detection unit 104, an image generation unit 105, an image outputting unit 106, and a detection area inputting unit 107. The electronic data outputting unit 101, the pointer inputting apparatus 102, the image capturing unit 103, the index detection unit 104, the image generation unit 105, the image outputting unit 106, and the detection area inputting unit 107 are similar in their functions to those described in the first exemplary embodiment. A display apparatus 14 illustrated in FIG. 7 is similar to the display apparatus 14 described in the first exemplary embodiment.

The image distribution system according to the present exemplary embodiment has the above-described configuration and can operate to realize the processing described in the first exemplary embodiment. In this manner, effects of the present invention can be obtained even if the function of each functional component that constitutes the image distribution system is modified.

Figure 8:
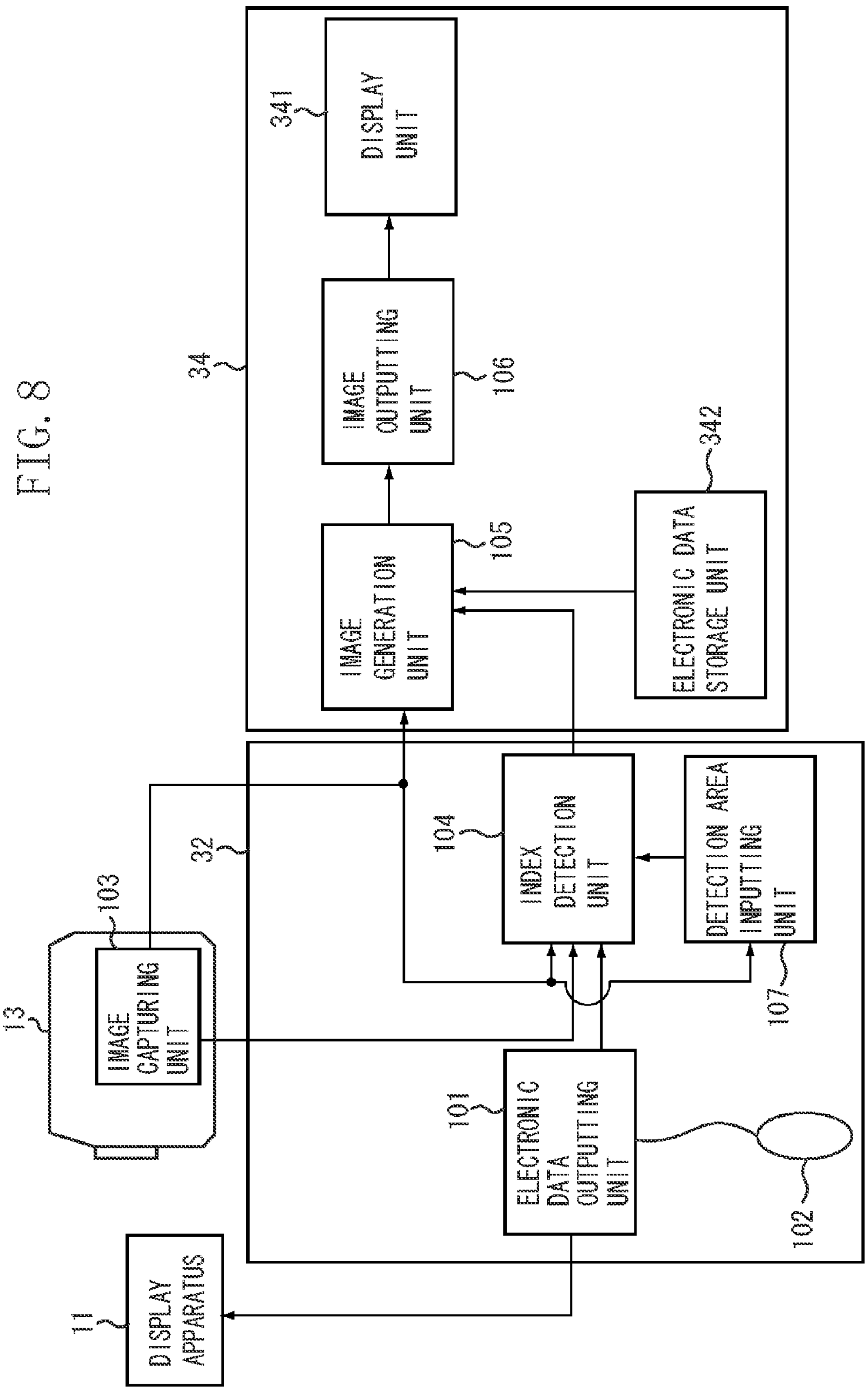
FIG. 8 illustrates an example of an apparatus configuration of an image distribution system according to a third exemplary embodiment of the present invention.

Next, an image distribution system according to a third exemplary embodiment of the present invention is described below. FIG. 8 illustrates an example of an apparatus configuration of the image distribution system according to the third exemplary embodiment. In the present exemplary embodiment, constituent components similar to those described in the first exemplary embodiment are denoted by the same reference numerals and their descriptions are not repeated.

More specifically, a display apparatus 11 illustrated in FIG. 8 is similar to the display apparatus 11 illustrated in FIG. 1. In the present exemplary embodiment, an information processing apparatus 32 includes an electronic data outputting unit 101, a pointer inputting apparatus 102, an index detection unit 104, and a detection area inputting unit 107.

The information processing apparatus 32 can store electronic data output by the electronic data outputting unit 101. The electronic data outputting unit 101, the pointer inputting apparatus 102, the index detection unit 104, and the detection area inputting unit 107 are similar in their functions to those described in the first exemplary embodiment. An imaging apparatus 13 illustrated in FIG. 8 is similar to the imaging apparatus 13 described in the first exemplary embodiment.

In the present exemplary embodiment, a display apparatus 34 can be generally configured as a personal computer that is associated with a display apparatus. The display apparatus 34 includes an image generation unit 105, an image outputting unit 106, a display unit 341, and an electronic data storage unit 342. The image generation unit 105 and the image outputting unit 106 are similar in their functions to those described in the first exemplary embodiment.

In the present exemplary embodiment, the display apparatus 34 can receive a conference video and a synchronization signal of electronic data from the information processing apparatus 32 (i.e., the transmission side). The display apparatus 34 can further receive index detection information from the index detection unit 104. The image generation unit 105 can display either the conference video transmitted from the image capturing unit 103 or electronic data stored in the electronic data storage unit 342 based on the index detection result received from the index detection unit 104.

When the image generation unit 105 displays the electronic data, the image generation unit 105 can display a corresponding slide using an electronic data synchronization signal. The image generation unit 105 can further generate and display a composite image including pointer information detected by the index detection unit 104 which is superimposed on the image.

The image outputting unit 106 can be generally configured as a display adapter that can supply output images to the display unit 341 which is disposed on the downstream side of the image outputting unit 106. The display unit 341 can be generally configured as a liquid crystal display (LCD) device or a comparable display device. The electronic data storage unit 342 is a storage apparatus that can receive and store the electronic data which has been displayed on the display apparatus 11. The electronic data storage unit 342 can be configured as a semiconductor storage element or can be realized using a magnetic storage or other method.

The image distribution system according to the present exemplary embodiment has the above-described configuration and can perform the processing described in the first exemplary embodiment by changing a transmission terminal and a reception terminal. In addition to the above-described effects of the first exemplary embodiment, the present exemplary embodiment can reduce a communication band between the information processing apparatus 32 (i.e., the transmission terminal) and the display apparatus 34 (i.e., the reception terminal) because it is unnecessary to immediately transmit electronic data between the information processing apparatus 32 and the display apparatus 34.

Figure 9:
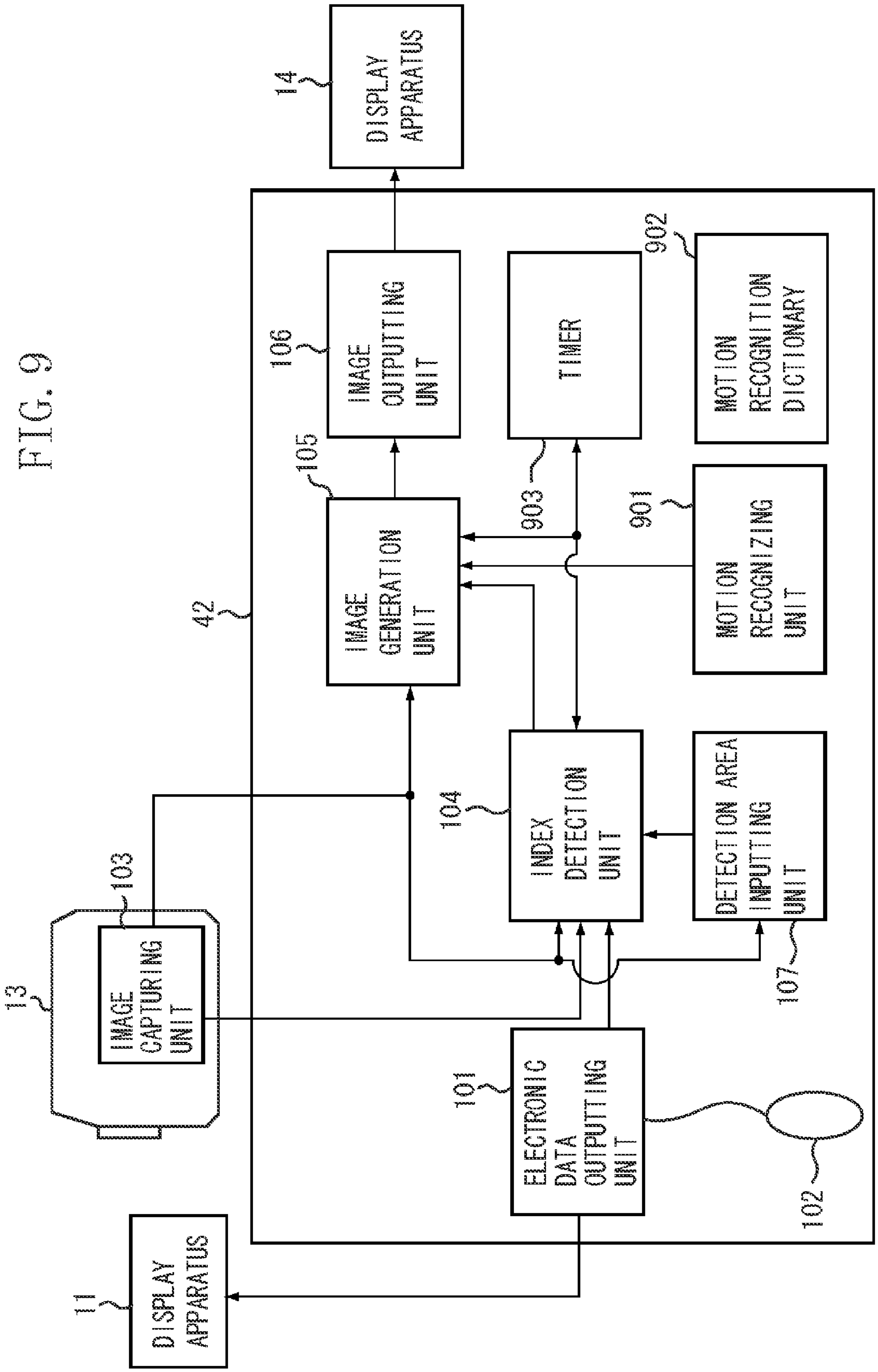
FIG. 9 illustrates an example of an apparatus configuration of an image distribution system according to a fourth exemplary embodiment of the present invention.

Next, an image distribution system according to a fourth exemplary embodiment of the present invention is described below. FIG. 9 illustrates an example of an apparatus configuration of the image distribution system according to the fourth exemplary embodiment. In the present exemplary embodiment, constituent components similar to those described in the first exemplary embodiment are denoted by the same reference numerals and their descriptions are not repeated.

A display apparatus 11 illustrated in FIG. 9 can be configured as a combination of a forward projection type projector and a screen or can be configured as a large-scale display apparatus. The display apparatus 11 is connected to a below-described information processing apparatus 42 and a content to be displayed thereon is controlled by the information processing apparatus 42.

The information processing apparatus 42 includes a CPU, a ROM, and a RAM. The CPU can execute each program loaded in the RAM from the ROM, so that the information processing apparatus 42 can perform a required operation. The information processing apparatus 42 can be generally configured as a personal computer. An operator (who may be identical to a presenter) can operate the information processing apparatus 42 to display a material for use in presentation (i.e., electronic data representing a content to be presented) using the display apparatus 11.

An example of an internal configuration of the information processing apparatus 42 is described below in detail. As described above, a general personal computer can realize the information processing apparatus 42 according to the present exemplary embodiment. However, any other apparatus which has similar capabilities and functions can be used as the information processing apparatus 42 according to the present exemplary embodiment.

The imaging apparatus 13 can be generally configured as a digital video camera. The imaging apparatus 13 can include a panning mechanism and a tilting mechanism, if these mechanisms are required. In this case, the imaging apparatus 13 can control a panning amount and a tilting amount. The imaging apparatus 13 can further include a zooming mechanism and can control a zooming amount. The imaging apparatus 13 can capture a moving image of a presenter or the display apparatus 11 as a conference video. The imaging apparatus 13 includes an image capturing unit 103 that can capture images, an interface, and a power source device (not illustrated). The image capturing unit 103 has a configuration similar to that described in the first exemplary embodiment.

The information processing apparatus 42 has the following internal configuration. An electronic data outputting unit 101 is connected to the display apparatus 11. The electronic data outputting unit 101 can display electronic data stored in the information processing apparatus 42 on the display apparatus 11.

A pointer inputting apparatus 102 can be generally configured as a mouse connected to the information processing apparatus 42. Pointer information having been input via the pointer inputting apparatus 102 can be transmitted to the electronic data outputting unit 101. The electronic data outputting unit 101 superimposes a pointer on electronic data and causes the display apparatus 11 to display a composite image. Meanwhile, a below-described index detection unit 104 can receive position information of the pointer.

The index detection unit 104 can receive a conference video from the image capturing unit 103 and can detect a pointer that is present in a pointer detection area. The index detection unit 104 can receive the electronic data output from the electronic data outputting unit 101 and can detect the pointer included in the received electronic data. The pointer detection area is an area (such as a designated area in a screen) that can be arbitrarily designated by the detection area inputting unit 107 in a below-described starting state. Generally, the pointer detection area is an area in which the electric data is displayed on the display apparatus 11 in an angle of view.

The index detection unit 104 can set the area designated by the detection area inputting unit 107 as the pointer detection area. Further, a video to be used to detect a pointer which is a part of the conference video (i.e., images) acquired by the image capturing unit 103 is input to the index detection unit 104. Thus, the index detection unit 104 can detect a pointer from the conference video input via the image capturing unit 103. The pointer to be detected is, for example, a pointer instructed by the pointer inputting apparatus 102 or a laser pointer used by a presenter.

The index detection unit 104 converts information relating to a number of detected pointers into electronic data. The index detection unit 104 further converts horizontal and vertical coordinate values of each detected pointer included in the conference video into coordinate values of electronic data. Subsequently, the index detection unit 104 sends the converted data to an image generation unit 105 which is positioned on the downstream side of the index detection unit 104.

To realize the coordinate conversion, the index detection unit 104 can apply affine transformation to the pointer detection area and perform mapping to obtain coordinates of the electronic data. Further, the index detection unit 104 acquires electronic data from the electronic data outputting unit 101 and horizontal and vertical coordinate values in the electronic data input via the pointer inputting apparatus 102. The index detection unit 104 sends the acquired data to the image generation unit 105.

The image generation unit 105 can receive the conference video output from the image capturing unit 103 as well as presently displayed electronic data output from the electronic data outputting unit 101. The image generation unit 105 can further receive pointer detection result information of a pointer involved in the conference video and a pointer detection result obtained from the electronic data that are both detected by the index detection unit 104, a recognition result obtained by a below-described motion recognizing unit 901, and elapsed time measured by a below-described timer 903.

Figure 10:
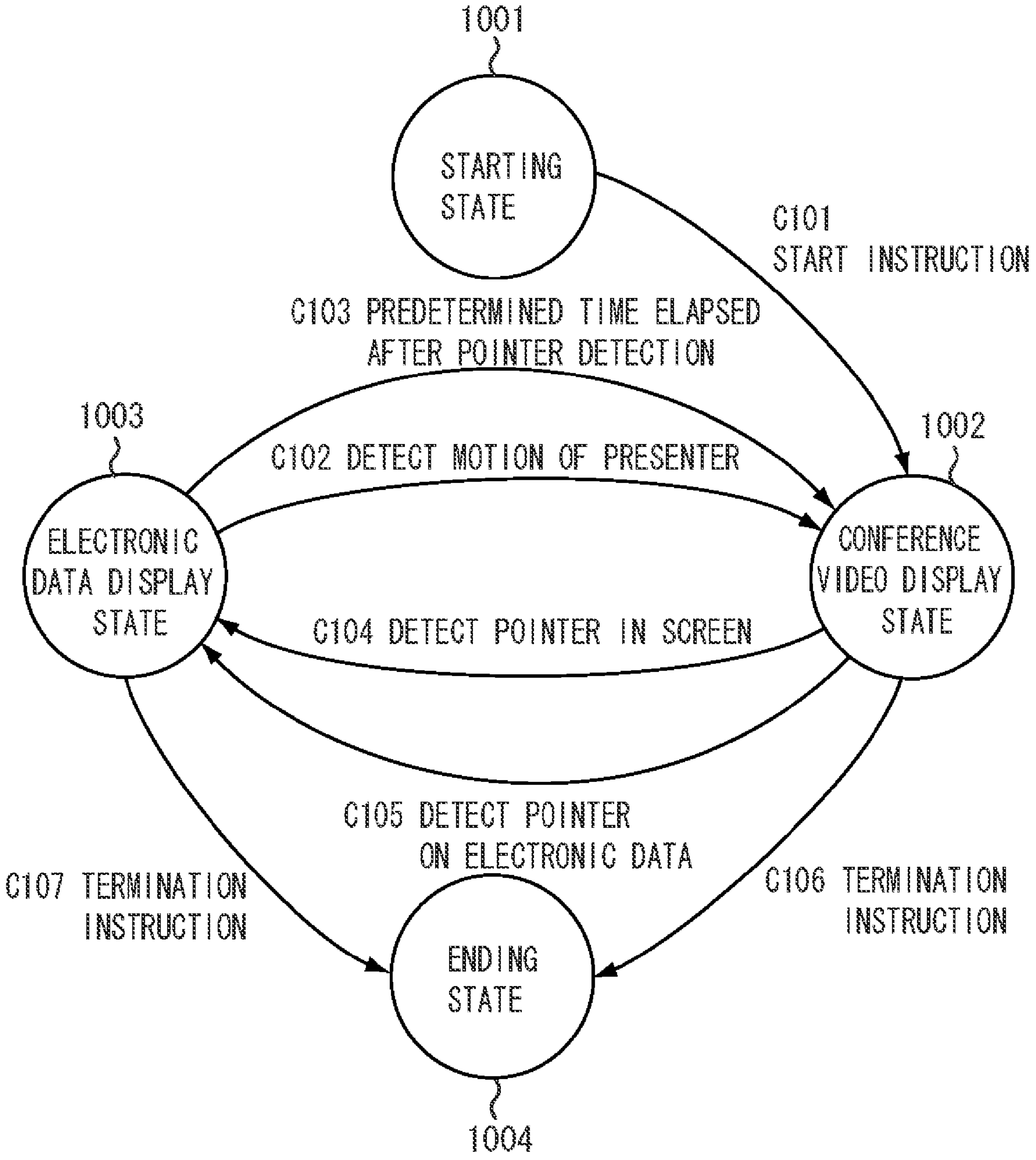
FIG. 10 is a state transition diagram illustrating an example of state transition of the image distribution system according to the fourth exemplary embodiment.

Then, the image generation unit 105 determines whether to display the conference video or the electronic data based on the above-described information, such as the pointer detection result information referring to state transitions illustrated in FIG. 10. The image generation unit 105 generates an output image based on the selected image. The state transitions illustrated in FIG. 10 are described below in detail.

Figure 11A:
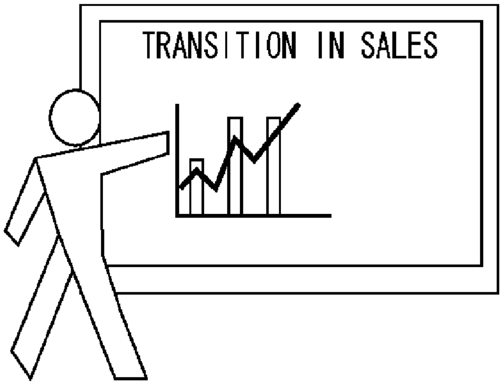
FIGS. 11A to 11F illustrate examples of a scene of an actual conference room and examples of a display screen of a monitor located near a participant when the image distribution system according to the fourth exemplary embodiment is used.
Figure 11B:
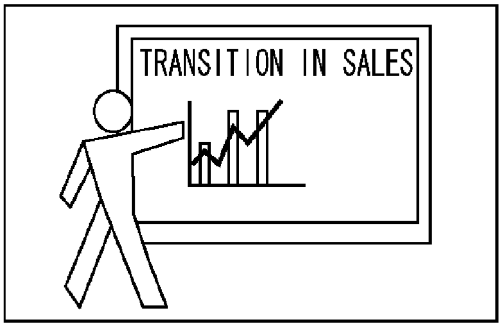
Figure 11C:
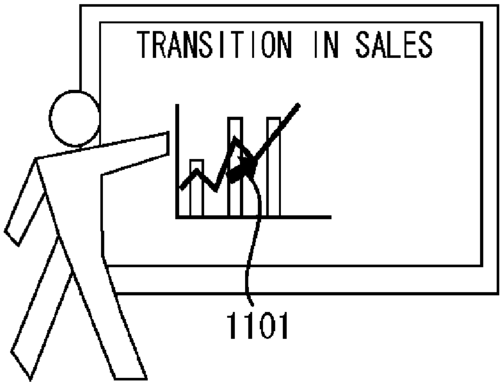
Figure 11D:
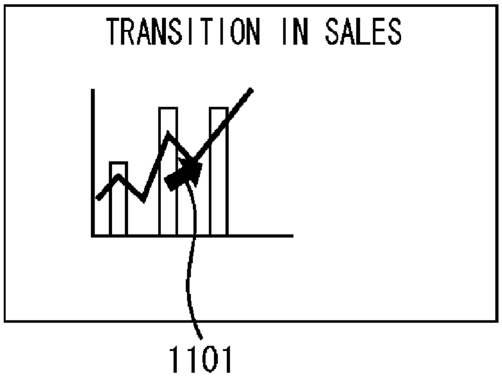
Figure 11E:
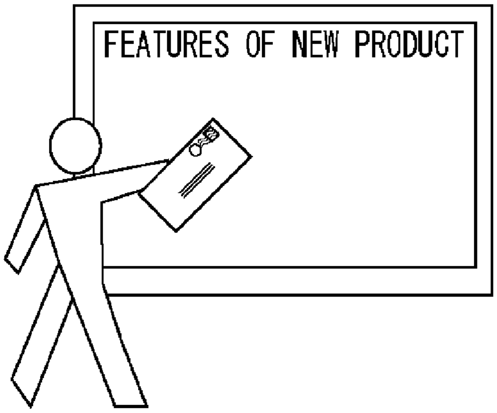

An example of image generation, either the conference video or the electronic data can be simply selected. It is also useful to provide two display areas in an output image and largely display a selected image. Alternatively, the selected image can be displayed on the front side. Further, simultaneously generated images can be compression coded to reduce the amount of data to be processed. Moreover, when the image generation unit 105 outputs the electronic data, the image generation unit 105 can superimpose the above-described pointer detection result information (i.e., a pointer 1101) on the electronic data as illustrated in FIG. 11D.

In the present exemplary embodiment, the image generation unit 105 is provided in a transmission side. However, the image generation unit 105 can be provided in a reception side, namely a display apparatus 14 side. In this case, the image distribution system according to the present invention can be realized using application sharing, in which the electronic data can be shared between the transmission side and the reception side and the same application can be operated synchronously between the transmission side and the reception side.

In the application sharing, the image generation unit 105 can display the electronic data by synchronizing the electronic data shared beforehand without receiving any data from the transmission side. In this case, the image generation unit 105 can generate a composite image including the pointer detection result information superimposed on the electronic data.

An image outputting unit 106 receives the image generated by the image generation unit 105 and can output the received image to one or more monitors (e.g., the display apparatus 14) according to a predetermined protocol. The image outputting unit 106 can be, for example, a display adapter configured to control a monitor if the display adapter can output images to the monitor that is present in the same conference room.

In this case, the image outputting unit 106 can output images via a general output terminal, such as a DVI output terminal. Further, when the image distribution system performs remote distribution of images, the image outputting unit 106 can be generally configured as a network adapter, such as Ethernet, which can output an image according to a general TCP/UDP protocol.

An operator of the image distribution system according to the present exemplary embodiment can designate an area of electronic data displayed from a conference video in a starting state (i.e., a state where the imaging apparatus 13 starts recording the conference video after the conference starts). The detection area inputting unit 107, as described above, inputs information relating to the predetermined area designated by the operator into the index detection unit 104.

The motion recognizing unit 901 can be used to detect a gesture of the presenter which is defined beforehand. The motion recognizing unit 901 can extract a human from a conference image acquired by the image capturing unit 103. Then, the motion recognizing unit 901 can discriminate a gesture of the extracted human referring to a below-described motion recognition dictionary 902.

Figure 11F:
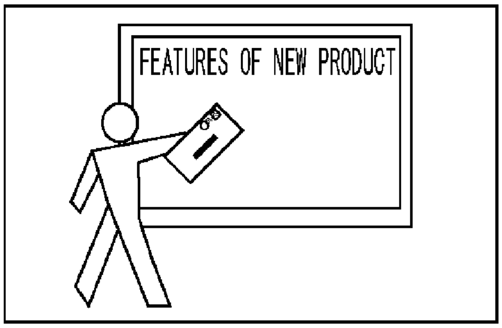

For example, the motion recognizing unit 901 can discriminate a motion of an arm between a "pointing" behavior and a "raising" behavior. The image generation unit 105 receives a recognition result from the motion recognizing unit 901. If the motion recognizing unit 901 detects a specific gesture, the motion recognizing unit 901 can output a conference video as illustrated in FIG. 11F.

The motion recognition dictionary 902 stores a database to be referred to when the motion recognizing unit 901 performs the above-described gesture determination processing. The motion recognition dictionary 902 can be configured as a semiconductor storage element or can be stored using any other method.

The timer 903 for measuring elapsed time can be reset when a pointer is detected by the index detection unit 104. In other words, the timer 903 can measure the time having elapsed since a detection of the previous pointer.

Next, an example of an operation that can be performed by the above-described image distribution system according to the present exemplary embodiment is described with reference to FIGS. 10 to 13. FIG. 10 is a state transition diagram illustrating an example of various state transitions of the image distribution system according to the present exemplary embodiment.

FIGS. 11A to 11F illustrate examples of a scene of an actual conference room and examples of a display screen of the display apparatus 14 (i.e., a monitor located near a participant) when the image distribution system according to the present exemplary embodiment is used.

Figure 12:
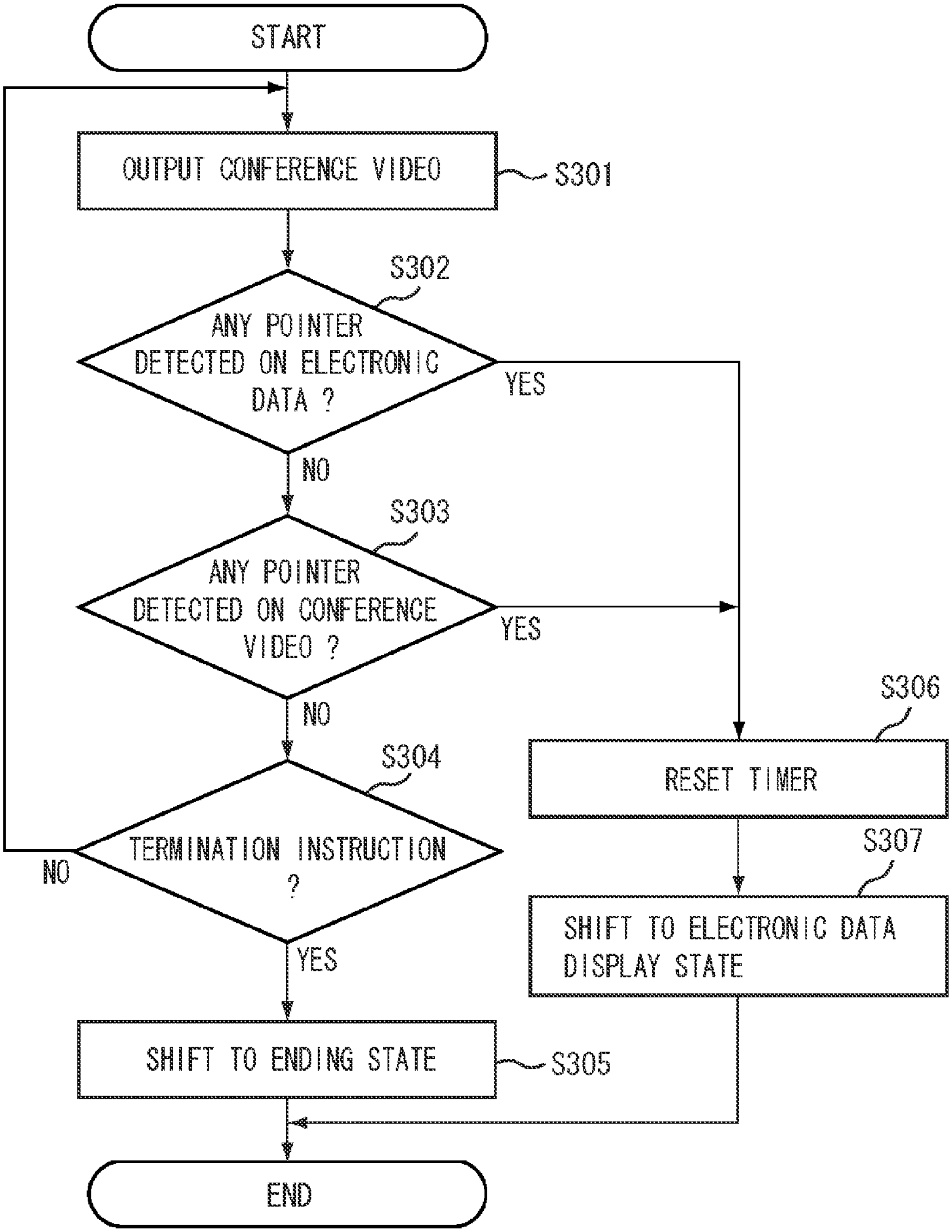
FIG. 12 is a flowchart illustrating an example of processing to be executed in a conference video display state of the image distribution system according to the fourth exemplary embodiment.
Figure 13:
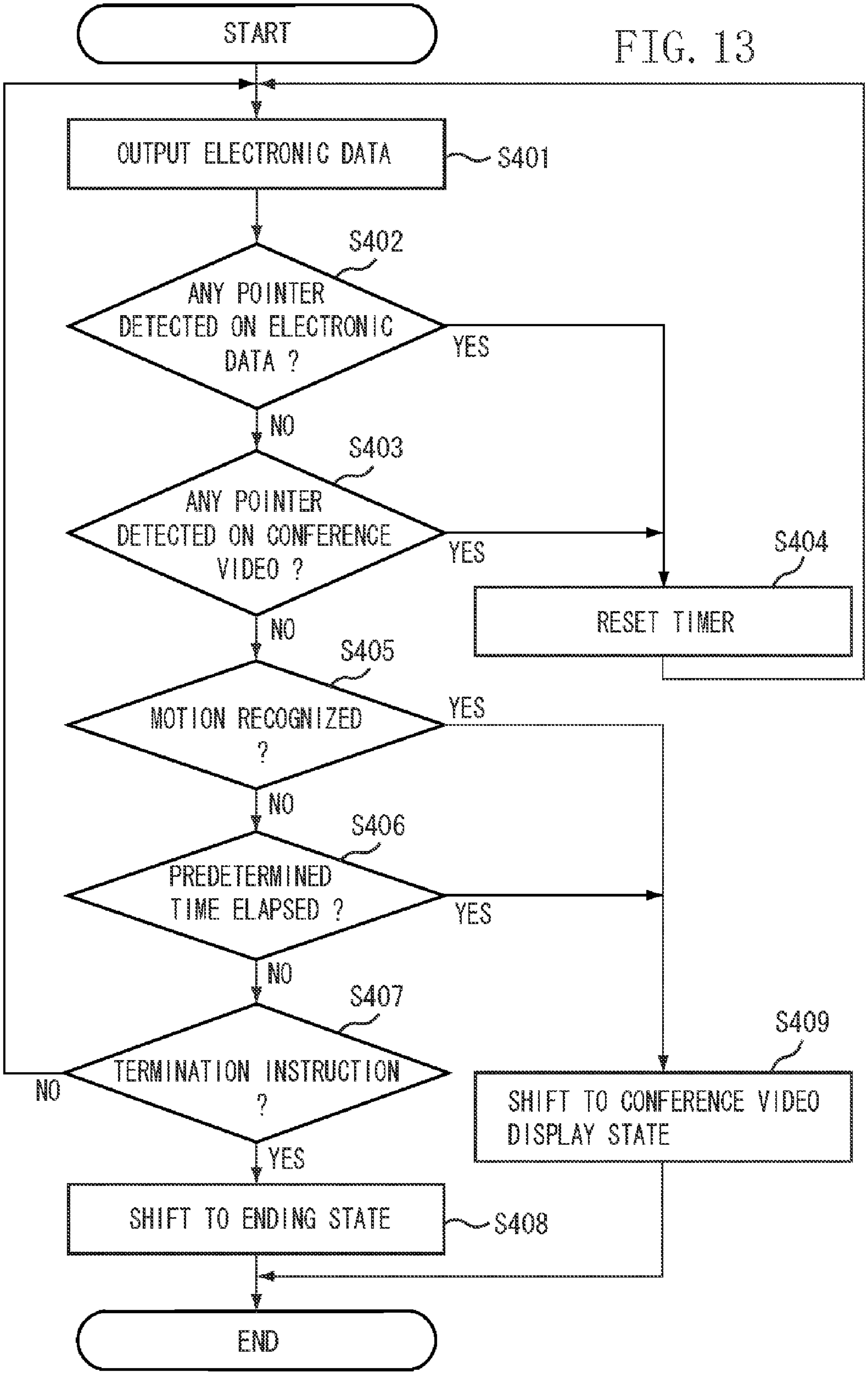
FIG. 13 is a flowchart illustrating an example of processing to be executed in an electronic data display state of the image distribution system according to the fourth exemplary embodiment.
Figure 14:
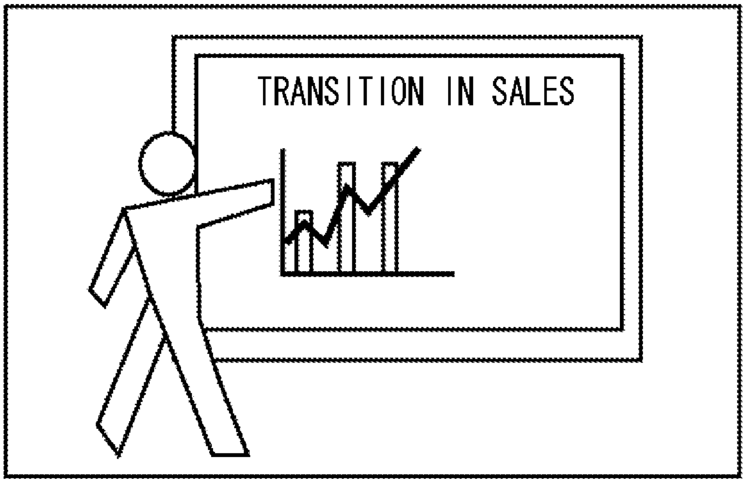
FIG. 14 illustrates an example of a scene in a conference in which electronic data is displayed on a large-scale screen.

FIG. 12 is a flowchart illustrating an example of processing to be executed in a conference video display state 1002 of the image distribution system, which is one of the state transitions illustrated in FIG. 10. FIG. 13 is a flowchart illustrating an example of processing to be executed in an electronic data display state 1003 of the image distribution system, which is one of the state transitions illustrated in FIG. 10.

First, various state transitions of the image distribution system according to the present exemplary embodiment are described below with reference to FIG. 10. In FIG. 10, the image distribution system is in a starting state 1001 when the image distribution system performs a startup operation. In the starting state, the detection area inputting unit 107 instructs an operator to input a detection area. If the operator completes the input operation, the detection area inputting unit 107 notifies the index detection unit 104 of input area information, and waits for a start instruction to be input by the operator.

In FIG. 10, a transition condition C101 indicates a transition from the starting state to the below-described conference video display state 1002. The transition condition C101 can be satisfied, for example, when the operator presses the start button (not illustrated) to input the start instruction.

In the conference video display state 1002, the image generation unit 105 generates an image based on a conference video received from the image capturing unit 103. The image generation unit 105 transfers the generated image to the image outputting unit 106. FIG. 11B illustrates an example of the image output from the image outputting unit 106 in the conference video display state 1002. FIG. 11A illustrates an example of a scene of an actual conference room corresponding to FIG. 11B.

Further, in FIG. 10, the image distribution system shifts its operational state from the conference video display state 1002 to the below-described electronic data display state 1003 when at least one of transition conditions C104 and C105 is satisfied. Moreover, the image distribution system shifts its operational state from the conference video display state 1002 to a below-described ending state 1004 when a transition condition C106 is satisfied.

The transition condition C104 can be satisfied when a pointer is detected in a detection area of a conference video acquired by the image capturing unit 103. Accordingly, when a presenter or a conference participant points somewhere on an image displayed by the display apparatus 11 with a laser pointer, the transition condition C104 can be satisfied. The transition condition C105 can be satisfied when the presenter operates the pointer inputting apparatus 102 of the information processing apparatus 42 to display (superimpose) a pointer on electronic data. For example, the transition condition C106 can be satisfied when the operator presses the termination button (not illustrated) to input the termination instruction.

In the electronic data display state 1003, the image generation unit 105 generates an image based on electronic data received from the electronic data outputting unit 101 and sends the generated image to the image outputting unit 106. FIG. 11D illustrates an example of the image output from the image outputting unit 106 in the electronic data display state 1003. FIG. 11C illustrates an example of a scene of the actual conference room corresponding to FIG. 11D.

In each of FIGS. 11C and 11D, the pointer 1101 (i.e., a mark having a bold arrow shape) is illustrated. In FIG. 10, the image distribution system shifts its operational state from the electronic data display state 1003 to the conference video display state 1002 when at least one of transition conditions C102 and C103 is satisfied. The transition condition C102 can be satisfied when the motion recognizing unit 901 can recognize a gesture of the presenter. The transition condition C103 can be satisfied when the elapsed time measured by the timer 903 has reached a predetermined time.

The timer 903 measures the time having elapsed since the latest pointer detection performed by the index detection unit 104. More specifically, the transition condition C103 can be satisfied when a predetermined time has elapsed in a state where no pointer can be detected not only in the detection area of the conference video acquired by the image capturing unit 103 but also on the electronic data.

Further, the image distribution system shifts its operational state from the electronic data display state 1003 to the below-described ending state 1004 when a transition condition C107 is satisfied. For example, the transition condition C107 can be satisfied when the operator presses the termination button (not illustrated) to input the termination instruction.

As described above, the image distribution system shifts its operational state to the ending state 1004 if the operator presses the termination button (not illustrated), for example, in the conference video display state 1002 or in the electronic data display state 1003.

An example of condition determination processing to be executed in the conference video display state 1002, which can be performed by the image distribution system according to the present exemplary embodiment, is described below with reference to FIG. 12. First, in step S301, the image outputting unit 106 outputs a conference video.

Next, in step S302, the index detection unit 104 tries to detect a pointer from electronic data displayed on the display apparatus 11. The processing performed in step S302 corresponds to the state transition condition C105. If the index detection unit 104 can detect a pointer (YES in step S302), the processing immediately proceeds to step S306. On the other hand, if the index detection unit 104 cannot detect any pointer from the electronic data (NO in step S302), the processing proceeds to step S303.

In step S303, the index detection unit 104 detects a pointer from a pointer detection area of the conference video obtained by the image capturing unit 103. The processing performed in step S303 corresponds to the state transition condition C104. If the index detection unit 104 can detect a pointing operation (YES in step S303), the processing immediately proceeds to step S306. On the other hand, if the index detection unit 104 cannot detect any pointing operation (NO in step S303), the processing proceeds to step S304.

In step S304, the CPU (not illustrated) included in the information processing apparatus 42 determines whether the termination instruction is input. The CPU executes the above-described processing (step S304) when the CPU detects an operation of the termination instruction button (not illustrated). If the termination instruction is input (YES in step S304), the processing proceeds to step S305. On the other hand, if the termination instruction is not input (NO in step S304), the processing returns to step S301. In step S305, the CPU (not illustrated) causes the image distribution system to shift its operational state to the ending state.

In step S306, the timer 903 performs a reset operation. More specifically, if the pointer is detected in step S302 or step S303, the timer 903 is reset and the processing immediately proceeds to step S307. In step S307, the CPU (not illustrated) causes the image distribution system to shift its operational state to the electronic data display state 1003.

Next, an example of condition determination processing to be executed in the electronic data display state 1003 which can be performed by the image distribution system according to the present exemplary embodiment is described below with reference to FIG. 13. First, in step S401, the image outputting unit 106 outputs electronic data.

In step S402, the index detection unit 104 detects a pointer from the electronic data displayed on the display apparatus 11. If the index detection unit 104 can detect a pointer (YES in step S402), the processing proceeds to step S404. On the other hand, if the index detection unit 104 cannot detect any pointer from the electronic data (NO in step 4202), the processing proceeds to step S403.

In step S403, the index detection unit 104 detects a pointer from the pointer detection area of the conference video acquired by the image capturing unit 103. If the index detection unit 104 can detect a pointing operation (YES in step S403), the processing proceeds to step S404. On the other hand, if the index detection unit 104 cannot detect any pointing operation (NO in step S403), the processing proceeds to step S405.

In step S404, the timer 903 performs the reset operation. Then, the processing returns to step S401. More specifically, as long as the pointer is continuously detected from the electronic data or on the conference video, the image distribution system maintains the electronic data display state 1003.

In step S405, the motion recognizing unit 901 performs motion recognition processing. If the motion recognizing unit 901 detects a predetermined motion (YES in step S405), the processing proceeds to step S409. On the other hand, if the motion recognizing unit 901 does not detect any predetermined motion (NO in step S405), the processing proceeds to step S406. As described above, when the pointer is continuously detected from the electronic data, the image distribution system maintains the electronic data display state 1003.

Therefore, in this case, the processing does not proceed to step S409 even if the motion recognizing unit 901 can recognize the predetermined motion. More specifically, the pointer detection processing is prioritized over the motion recognition processing.

In step S406, the image generation unit 105 evaluates the elapsed time measured by the timer 903. In the present exemplary embodiment, the image generation unit 105 stores a predetermined reference time (i.e., a threshold value) beforehand. The image generation unit 105 compares the elapsed time measured by the timer 903 with the predetermined reference time. If the elapsed time measured by the timer 903 has reached the predetermined reference time (YES in step S406), the processing proceeds to step S409. On the other hand, if the elapsed time measured by the timer 903 has not reached the predetermined reference time (NO in step S406), the processing proceeds to step S407.

In step S407, the CPU (not illustrated) included in the information processing apparatus 42 determines whether the termination instruction is input. The CPU executes the above-described processing (step S407) when the CPU detects an operation of the termination instruction button (not illustrated). If the termination instruction is input (YES in step S407), the processing proceeds to step S408. On the other hand, if the termination instruction is not input (NO in step S407), the processing returns to step S401.

Then, in step S408, the CPU (not illustrated) causes the image distribution system to shift its operational state to the ending state. In step S409, the CPU (not illustrated) causes the image distribution system to shift its operational state to the conference video display state 1002.

The image distribution system according to the fourth exemplary embodiment of the present invention has the above-described configuration and can perform the above-described operations. More specifically, the image distribution system according to the present exemplary embodiment can bring an effect of automatically resuming a normal display of a conference video when a predetermined time has elapsed after the display of a pointer is turned off, in addition to the effects of the above-described first exemplary embodiment.

Further, the image distribution system according to the present exemplary embodiment enables a participant to find a portion to be looked at in the conference video according to an operation of a presenter. Thus, the image distribution system according to the present exemplary embodiment can realize adaptive processing suitable for an actual conference.

The image distribution system according to the present invention has the features described in the above-described first to fourth exemplary embodiments. However, the present invention is not limited to the above-described exemplary embodiments and can be modified in various ways. For example, the system configuration described in the second or third exemplary embodiment can further include the motion recognizing unit 901 and the timer 903 described in the fourth exemplary embodiment that can realize the above-described functions.

Further, each of the above-described exemplary embodiments includes only one imaging apparatus. However, the image distribution system according to the present invention can be modified to include two or more imaging apparatuses. In this case, the image distribution system can detect a plurality of pointers from images captured by respective imaging apparatuses and select a conference video or electronic data.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-287110 filed Nov. 7, 2008, which is hereby incorporated by reference herein in its entirety.

What is claimed is:

1. A display control apparatus, having a processor, which controls displaying data by a first display device, comprising:

an output unit configured to output first display data to a second display device;

a receiving unit configured to receive captured image data from an image capturing device for capturing an image including a display image displayed by the second display device;

a detection unit configured to detect that a coordinate in the display image displayed by the second display device is pointed;

a motion detection unit configured to detect a predetermined motion in the image captured by the image capturing device; and a control unit configured to give priority to a detection of the coordinate over a detection of the predetermined motion for controlling the displaying data by the first display device such that the first display data is kept selected for display by the first display device in a state while the coordinate in the display image is pointed and the captured image data is selected for displaying by the first display device when the predetermined motion is detected in a state while the coordinate in the display image is not pointed.

2. The display control apparatus according to claim 1 further comprising:

a measuring unit configured to measure a time period during which the detection unit does not detect any pointing of the coordinate in the display image, wherein the control unit selects the captured image data for displaying by the first display device if the time period during which the detection unit does not detect any pointing of the coordinate in the display image has reached a predetermined time, in a state where the display data is selected after the detection unit detects that the coordinate in the display image has been pointed and the motion detection unit does not detect the predetermined motion.

3. The display control apparatus according to claim 1, wherein the control unit selects the captured image data for displaying by the first display device if the motion detection unit detects the predetermined motion, in a state where the coordinate in the display image is not pointed and the display data has been displayed in accordance with a former detection of the coordinate.

4. The display control apparatus according to claim 1, wherein the detection unit detects the coordinate pointed by a laser pointer.

5. The display control apparatus according to claim 1, wherein the detection unit detects the coordinate pointed by a mouse.

6. A method for controlling a display operation to be performed by a display control apparatus which controls displaying data by a first display device, the method comprising:

outputting first display data to a second display device;

receiving captured image data from an image capturing device for capturing an image including a display image displayed by the second display device;

detecting that a coordinate in the display image displayed by the second display device is pointed;

detecting a predetermined motion in the image captured by the image capturing device; and giving priority to a detection of the coordinate over a detection of the predetermined motion for controlling the displaying data by the first display device such that the first display data is kept selected for display by the first display device in a state while the coordinate in the display image is pointed and the captured image data is selected for displaying by the first display device when the predetermined motion is detected in a state while the coordinate in the display image is not pointed.

7. The method according to claim 6, further comprising measuring a time period during which any pointing of the coordinate in the display image is not detected, wherein the captured image data for displaying by the first display device is selected if the time period during which any pointing of the coordinate in the display image is not detected has reached a predetermined time, in a state where the display data is selected after it is detected that the coordinate in the display image has been pointed and the predetermined motion is not detected.

8. A non-transitory storage medium storing a program which, when executed by a computer, controls displaying data by a first display device, the program comprising:

outputting first display data to a second display device;

receiving captured image data from an image capturing device for capturing an image including a display image displayed by the second display device;

detecting that a coordinate in the display image displayed by the second display device is pointed;

detecting a predetermined motion in the image captured by the image capturing device; and giving priority to a detection of the coordinate over a detection of the predetermined motion for controlling the displaying data by the first display device such that the first display data is kept selected for display by the first display device in a state while the coordinate in the display image is pointed and the captured image data is selected for displaying by the first display device when the predetermined motion is detected in a state while the coordinate in the display image is not pointed.

9. The program according to claim 8, further comprising:

measuring a time period during which any pointing of the coordinate in the display image is not detected, wherein the captured image data for displaying by the first display device is selected if the time period during which any pointing of the coordinate in the display image is not detected has reached a predetermined time, in a state where the display data is selected after it is detected that the coordinate in the display image has been pointed and the predetermined motion is not detected.

* * * * *